United States Patent [19]

Vezzani et al.

[11] Patent Number: 5,347,917
[45] Date of Patent: Sep. 20, 1994

[54] MACHINE FOR PREPARING PASTA BASED DISHES

[75] Inventors: Enrico Vezzani, Milan; Mario Caliari, Cassano Magnago, both of Italy

[73] Assignee: Zini Prodotti Alimentari S.r.l., Milan, Italy

[21] Appl. No.: 875,781

[22] Filed: Apr. 29, 1992

[30] Foreign Application Priority Data

Apr. 30, 1991 [IT] Italy ................ MI 91 A 001179

[51] Int. Cl.⁵ .................... A47J 27/12; A47J 27/18
[52] U.S. Cl. .......................... 99/335; 99/339; 99/357; 99/407
[58] Field of Search ........... 99/330, 339, 357, 407, 99/411, 335

[56] References Cited

U.S. PATENT DOCUMENTS

| | | | |
|---|---|---|---|
| 1,060,500 | 4/1913 | Salmon | 99/339 |
| 2,978,975 | 4/1961 | Rossi | 99/330 |
| 3,109,359 | 11/1963 | Falla | 99/339 |
| 3,259,521 | 7/1966 | Crall | 99/330 |
| 3,608,473 | 9/1971 | Kearn et al. | |
| 3,882,767 | 5/1975 | Oyler | 99/339 |
| 4,450,757 | 5/1984 | Alfio | |
| 4,722,267 | 2/1988 | Galockin et al. | |
| 4,899,908 | 2/1990 | Kardiak | |

FOREIGN PATENT DOCUMENTS

| | | |
|---|---|---|
| 0380816 | 8/1990 | European Pat. Off. |
| 2593308 | 7/1987 | France |
| 2596250 | 10/1987 | France |
| 2200039 | 7/1988 | United Kingdom |

Primary Examiner—Timothy F. Simone
Assistant Examiner—Randall E. Chin
Attorney, Agent, or Firm—Sheridan Ross & McIntosh

[57] ABSTRACT

A machine for preparing pasta-based dishes for direct consumption starting from precooked deep-frozen pasta products, comprises at least one basket adapted to receive the dosages of precooked deep-frozen pasta, a vat containing heated water, a drive arrangement for moving the basket between a dipped position where the basket is submerged under the heated water contained in the vat for heating the precooked deep-frozen pasta and a removed position where the basket is removed from the vat.

19 Claims, 6 Drawing Sheets

MACHINE FOR PREPARING PASTA BASED DISHES

FIELD OF THE INVENTION

This invention relates to a machine for preparing pasta-based dishes for direct consumption starting from precooked deep-frozen pasta products.

BACKGROUND OF THE INVENTION

Modern industrial catering requires that meals be prepared in the simplest and quickest possible way.

The preparation of pasta-based dishes, customarily in greatest demand, unfortunately clashes with the above requirement.

In fact, it is well known that the cooking time of pasta is too long to meet the requirement for prompt serving. In addition, after cooking, pasta must be strained, an operation which is less than convenient to perform on a commercial scale.

It matters to observe, moreover, that the need to cook pasta products in commercial amounts ill suits the demand for proper cooking an apportionment of the pasta contingent on orders.

The pasta-making industry currently offers precooked deep-frozen pasta products which are basically standard pasta products thoroughly cooked to an optimum condition for consumption and then deep-frozen while in that condition. By simple subsequent heating, this precooked deep-frozen pasta can be consumed directly.

SUMMARY OF THE INVENTION

It is the object of this invention to provide a machine for preparing pasta-based dishes for direct consumption starting from precooked deep-frozen pasta products, which satisfies the aforesaid requirement and demand.

This object is achieved by a machine for preparing pasta-based dishes for direct consumption starting from precooked deep-frozen pasta products, comprising at least one basket adapted to receive dosages of precooked deep-frozen pasta, a vat containing heated water, a means of moving the basket between an immersed position where the basket is submerged under the heated water contained in the vat for heating the precooked deep-frozen pasta and a removed position where the basket is removed from the vat.

BRIEF DESCRIPTION OF THE DRAWINGS

For a better understanding of the features and advantages of this invention, a detailed description of two exemplary, non-limitative embodiments thereof will be given next with reference to the accompanying illustrative drawings, wherein.

DETAILED DESCRIPTION OF THE PREFERRED EMBODIMENT

Figure 1:
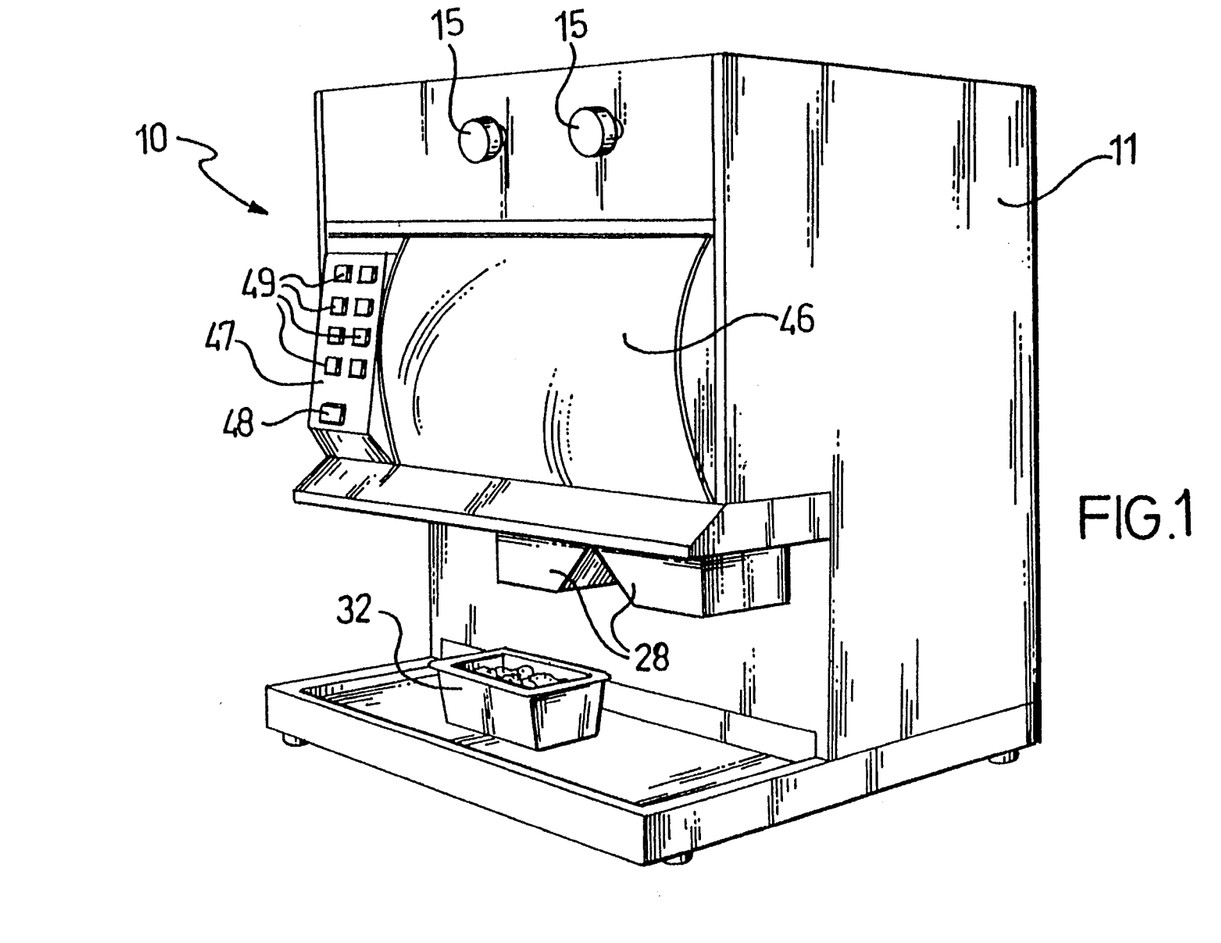
FIG. 1 is a perspective view of a machine, according to the invention, for preparing pasta-based dishes for direct consumption.

The machine generally shown at 10 in FIG. 1 has a body 11 housing and supporting the various machine components as explained hereinafter.

Figure 2:
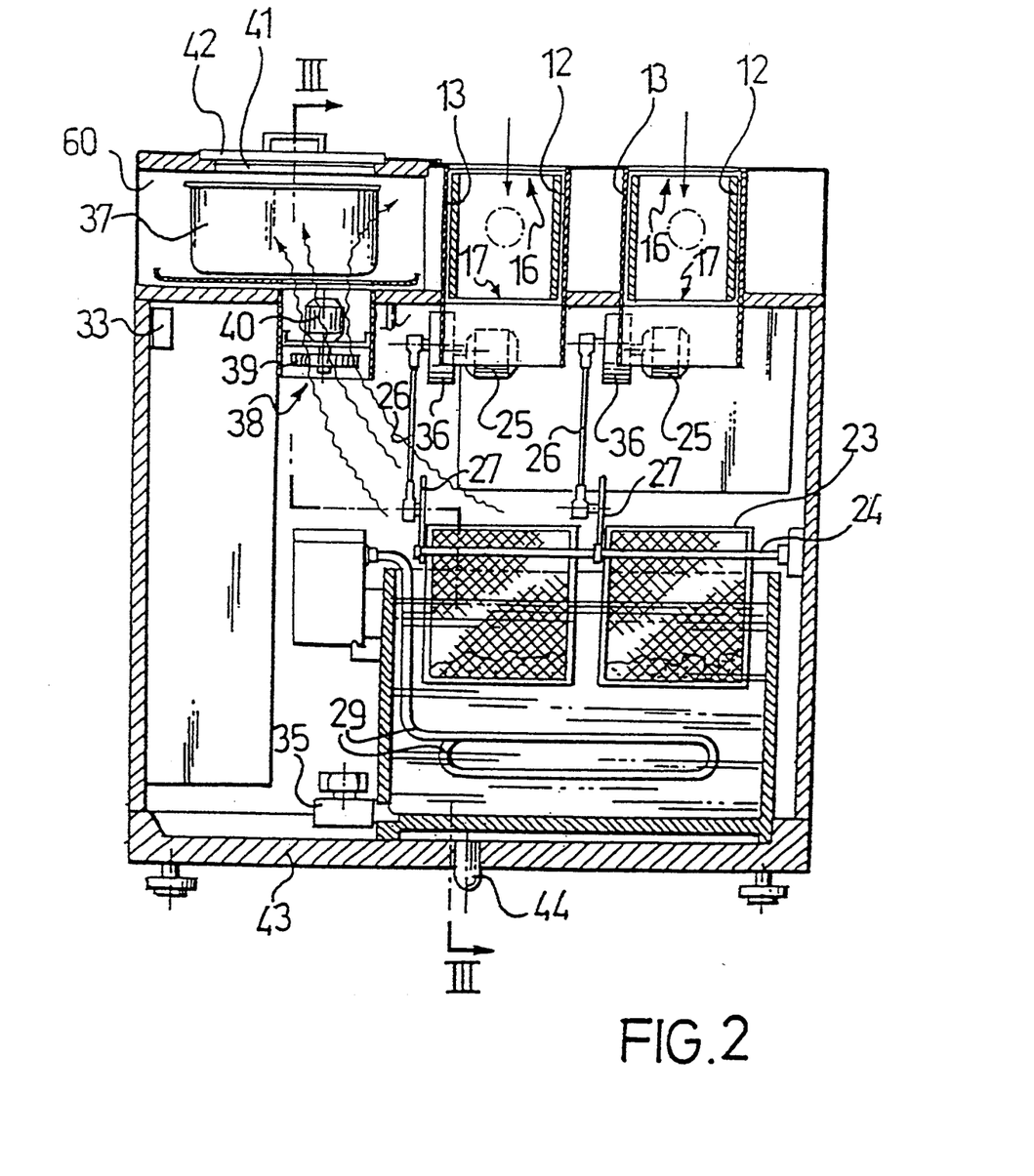
FIG. 2 is a front view section along line II—II in FIG. 3 of the machine shown in FIG. 1.
Figure 3:
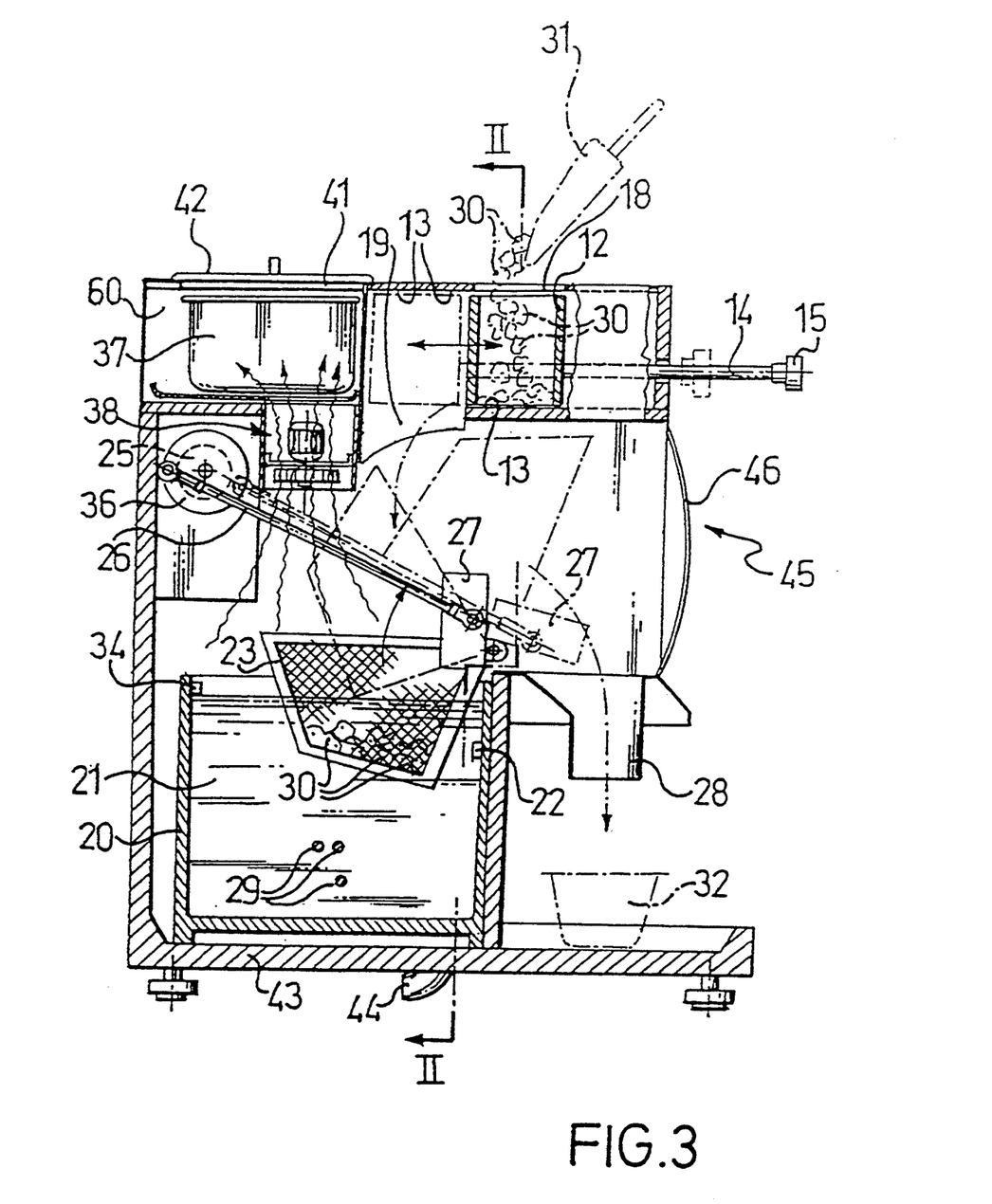
FIG. 3 is a side view section along line III—III in FIG. 2 of the machine shown in FIG. 1.

This machine 10 has a loading means comprising two chests 12, each slidable in a respective, box-type seat 13 inside the body 11. From each chest 12 there extends an integrally formed drive rod 14 which comes out of the body 11 front and is terminated with a knob 15. Each chest 12 is open at the top and the bottom, the top opening being indicated at 16 and the bottom one at 17; correspondingly therewith, the seat 13 has a top opening 18 for communication with the machine 10 exterior and a bottom opening 19 for communication with the machine interior. The two openings, 18 and 19, of the seat 13 are offset with respect to each other so as to overlap in no areas thereof.

Located beneath the bottom openings 19 of the seats 13 is an inner vat 20 containing water 21. Arranged within the vat 20 are an electric resistance heater 29 for heating the water 21 and a thermostat, diagrammatically represented by a block 22, for controlling the temperature of the water 21.

Mounted between the bottom openings 19 of the seats 13 and the vat 20 are two perforated baskets 23 which are pivoted on a shaft 24. Each basket 23 is in registry with a respective opening 19 and driven independently by a respective electric motor 25 connected to the basket 23 through a crank linkage; specifically, the motor 25 rotates a disc 36 whereon a connecting rod 26 is journalled with one end, the other connecting rod end being journalled on a shoulder 27 which extends from basket 23 and is integral therewith.

Arranged along the path of travel of each basket is a respective delivery outlet 28 which extends on the exterior of the body 11 of the machine 10.

The machine just described operates as follows:

A precooked deep-frozen pasta product, or as explained in the beginning, a pasta product cooked to an optimum condition for consumption and then deep-frozen while in this optimum condition, is introduced into the machine 10.

Prior to introducing the pasta into the machine 10, however, the electric resistance heater 29 is energized to bring the water 21 to boiling temperature; the thermostat 22 will de-energize the electric resistance heater 29 upon the water 21 attaining said boiling temperature and again energize said electric resistance heater on the water 21 temperature dropping below said boiling temperature.

Reference is now made to FIG. 3 which illustrates the operation of just one of the two chests 12 and of the underlying basket 23.

In order to have the precooked deep-frozen pasta, indicated at 30, fed in, the chest 12 should be moved to a position where the top opening 16 of the chest is aligned to the top opening 18 of the seat 13, as shown in full lines. This movement of the chest 12 is performed by pulling the knob 15 out so as to bring the chest to said position through the rod 14. Then, the precooked deep-frozen pasta 30 is introduced into the chest 12 through the openings 18 and 16, using a paddle 31, for example, as shown in dash and dot lines, until the chest is filled completely. Thereafter, by pushing in the knob 15, the chest 12 is moved into the position shown in dash and dot lines, where the bottom opening 17 of the chest comes to registry with the bottom opening 19 of the seat 13. In this situation, the pasta 30 will drop by gravity through the openings 17 and 19 into the basket 23 occupying the position shown schematically in dash lines where the basket is raised fully above the free surface of the boiling water 21.

At this point, the electric motor 25 is energized to lower the basket 23 into the vat 20 until the pasta 30 becomes fully submerged under the water (the basket shown in full lines). After a predetermined short time when the pasta 30 is heated to defrost and back to the optimum condition for consumption it had before deep-freezing, the motor 25 is again operated to return the basket 23 to its original raised position (shown in dash lines) where the now heated pasta 30 is strained. After a predetermined short straining time, the motor 25 will rotate the basket in a clockwise direction into the tilted position shown in dash and dot lines where the heated pasta 30 is unloaded from the basket by gravity and directed through the outlet 28 out into a container 32 for ultimate consumption.

The basket 23 is then returned by the motor 25 to its raised position shown in dash lines, in readiness for another processing cycle like that just described.

A timer, represented schematically by a block 33 and connected to the electric motor 25, controls the residence time of basket 23 in the various operational positions discussed and illustrated.

In order to keep a constant level for the water 21 in the vat 20, a level sensor is provided in the vat 20 at the free surface of the water, as represented schematically by a block 34, and a solenoid valve 35, located on the vat 20 exterior at the bottom of the vat and connected to the level sensor 34, is provided to control the inflow of water from a water supply external of the vat 20. Upon the level of the water 21 dropping below a preset level, the level sensor 34 will control the solenoid valve 35 to open and admit water into the vat 20, and control the solenoid valve to close as the predetermined water level is reached once again.

The other chest 12, and the other basket 23, not shown in FIG. 3, operate the same way.

Thus, the machine 10 can automatically issue dishes for direct consumption, starting from precooked deep-frozen pasta.

The various operations involved in the preparation of such pasta-based dishes for direct consumption can be apparently carried out in rapid sequence by virtue of the straightforward working movements provided for the chest 12 and the basket 23.

The operator would only intervene to load pasta 30 into the machine, all the other steps being carried out in a fully automatic manner, which makes the preparation of pasta dishes for direct consumption quite a simple matter.

The ability to keep the temperature of the water 21 controlled through the thermostat 22 and the residence time of the pasta 30 in the water 21 controlled through the timer 33, results in the pasta dish being issued in an optimum condition for immediate consumption.

The chests 12 allow the pasta to be properly metered by that each chest may be sized to contain an amount of precooked deep-frozen pasta appropriate to prepare a selected number of pasta servings, contingent on demands. For example, each chest 12 may contain an adequate amount of precooked deep-frozen pasta to prepare one pasta serving.

On that account, this machine 10 can be highly useful in the industrial catering field.

This machine 10 has a further advantageous feature, as follows:

The steam that evolves from the boiling water 21 in the vat 20 is conveyed into a chamber 60 wherein a vessel 37 is placed. As indicated by arrows, the steam is directed into the chamber 60 by force convection through a fan 38 comprising a fan rotor 39 and an electric motor 40 driving the fan rotor 39. The chamber 60 has a top opening 41 shut off from the outside by a lid 42.

Thus, the chamber 60 is turned into a closed heated chamber wherein the vessel 37 and its contents can be kept hot by the heat generated by the boiling water 21. The vessel 37 might contain a condiment, such as a sauce, ragout, etc., for adding to the prepared pasta. The vessel 37 could be replaced with the container 32 to keep the prepared pasta hot. The vessel 37 can be accessed to by just lifting the lid 42.

On contacting the vessel 37, steam condenses into drops, and this condensate is allowed to drip onto the bottom 43 of the machine body 11 whence it is drained off by gravity through a conduit 44. In this way, vapors and the accompanying smell can be trapped in which would otherwise create some obvious problems within the room where the machine is installed.

The front of the machine 10 has a window 45 closed by a clear screen 46 through which the baskets 23 can be observed at any operational stages, whether to monitor that the various steps proceed satisfactorily or to let the consumer survey the preparation of the pasta dish.

Also fitted to the front of the machine 10 is a panel 47 which incorporates control and monitoring circuitry for the machine 10, including the timer 33, which may be a microprocessor type. The front panel 47 is provided with an on/off pushbutton switch 48 and a cluster of pushbutton switches 49 connected to the timer 33, each controlling the movement of a basket 23 through a predetermined time sequence for preparing a specific kind of pasta. In essence, through the pushbutton controls 49, different kinds of pasta products can be processed, and one pasta variety be prepared in one of the two baskets 23 and another variety in the other of baskets 23.

It stands to reason that variations and/or additions to what has been described and illustrated above would be possible.

The arrangement used to load the precooked deep-frozen pasta into the machine may be other than that described and illustrated, based on the moving chests 12. As an example, a hopper is conceivable which has a movable bottom to be opened to unload the pasta into a basket after the hopper has been filled with pasta. It would also be possible to load the pasta directly into a basket through a chute communicating the exterior of the machine to its interior.

The motor driving the basket may be any motor type and coupled to the basket directly, rather than through a crank linkage.

The basket may be imparted any types of movements, not necessarily a rotary one, between the position where it is dipped in the water and the unloading position; for instance, the basket could be imparted a vertical translatory movement between the unload/strain position and the submerged position under water, and a rotary movement between the load/strain position and the unload position. The various basket movements can be implemented through means well within the capability of a skilled person in the art.

Of course, the machine could have a single basket, or more than two baskets, the choice depending on the output sought. The number of the loading means would then change to suit. Several water vats could be provided for dipping the baskets thereunto.

Also, there may be provided a number of heated chambers whereto the steam is lead, to accommodate vessels containing a range of different condiments. Several such vessels could be accommodated inside one and the same heated chamber. Alternatively, the steam could be admitted to the chambers by natural convection, although forced convection is definitely more effective.

Figure 4:
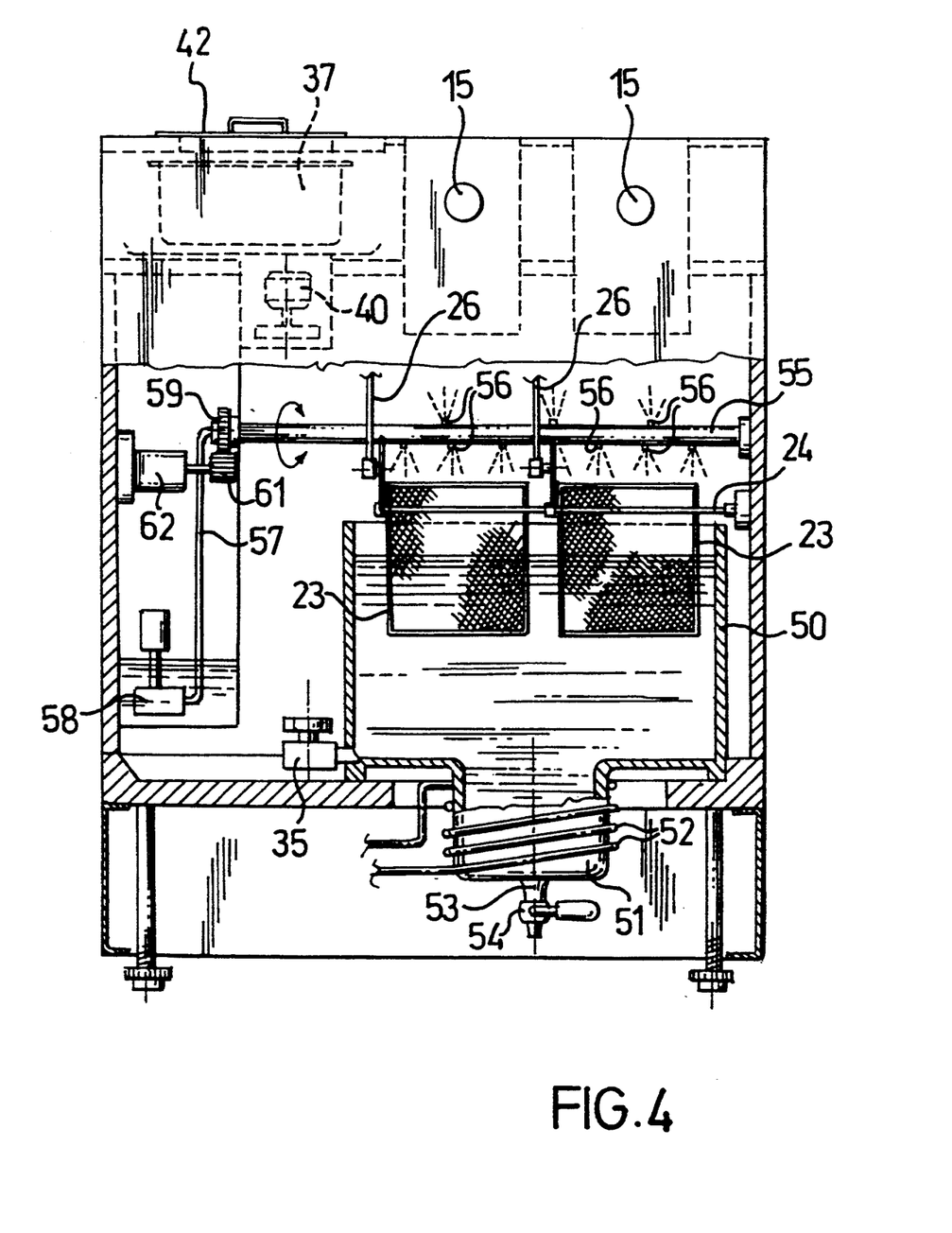
FIGS. 4, 5 show, according to the same sectional views as in FIGS. 2, 3, respectively, variations and additions to the machine shown in FIG. 1.
Figure 5:
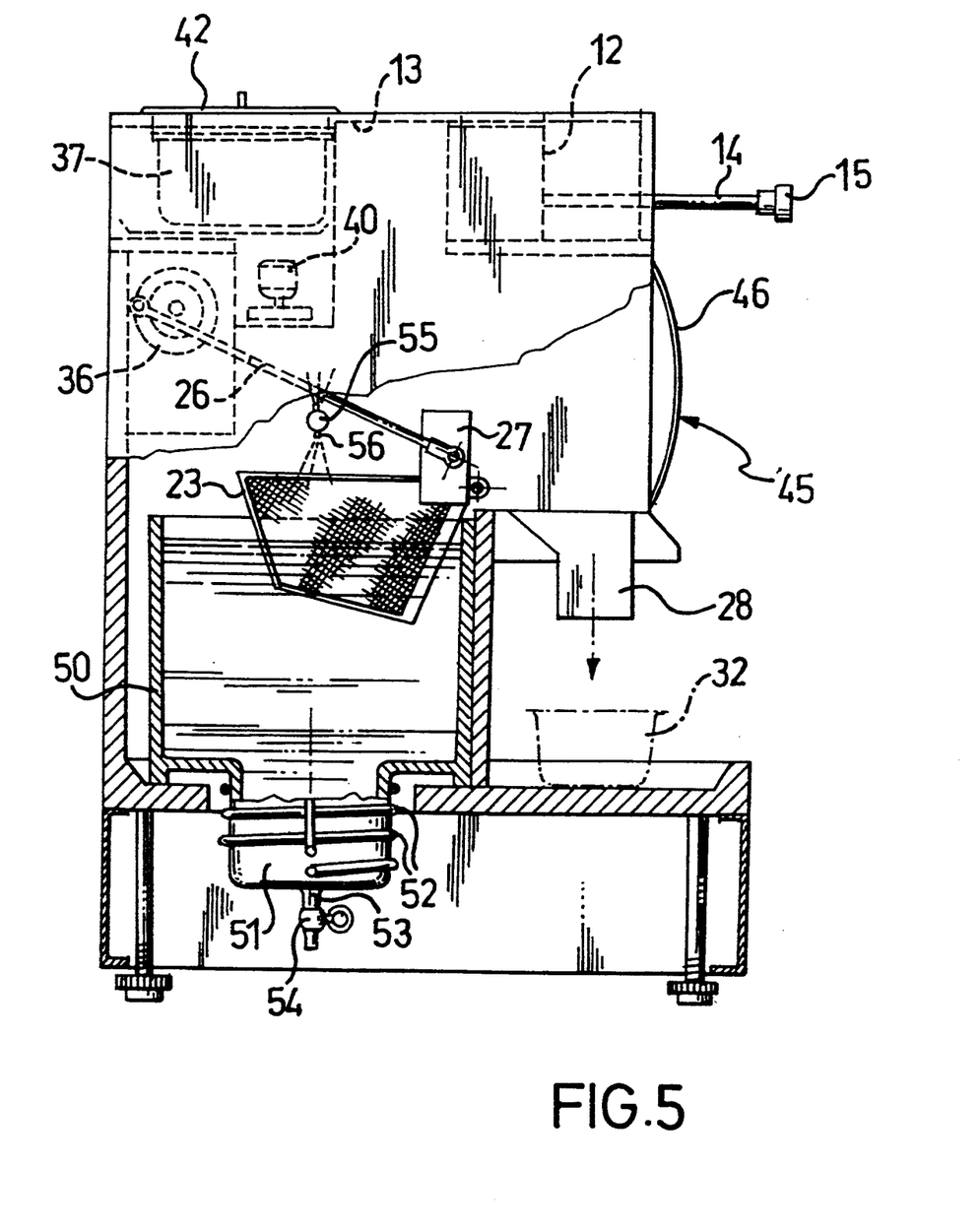

Shown in FIG. 4, 5 is an alternative vat to the previously discussed vat 20.

This alternative vat, indicated at 50, is provided on the bottom with a well 51 which extends downward from the bottom. Externally of the well 51 and wound around it is an electric resistance heater 52. The bottom end of the well 51 has a discharge port 53 which is provided with a manually (as shown in the drawing Figures) or electrically operated valve 54.

In order to raise the temperature of the water in the vat 50 to boiling temperature, the electric resistance heater 52 is operated to apply heat to the well 51 and the water contained therein. As a result, a definite convective motion of the water is established within the vat 50 which enables the water to be brought to boiling in a short time. This convective motion also promotes prompt heating of the precooked deep-frozen pasta dipped into the vat 50 during the working phase. By virtue of this convective motion, reduced power requirements can be additionally achieved for the electric resistance heater 52.

By opening the valve 54, the vat 50 can be emptied for cleaning and maintenance.

By placing the electric resistance heater on the outside of the vat, the cleaning and maintenance operations can be made easier and faster to carry out.

In order to make the cleaning of the machine internal components automatic, a flushing arrangement may be provided using jetted streams of a liquid such as water, or water plus a detergent, or just a detergent.

FIGS. 4, 5 show an embodiment of this flushing arrangement.

In essence, a rigid, straight supply pipe 55 is provided having delivery nozzles 56 arranged at suitable locations. This pipe 55 is mounted, at its ends, on specially provided holders so as to be freely rotatable about its axis. One end of the pipe 55 is closed off and the other end communicated to a conduit 57 through a rotary union; the conduit 57 is communicated, in turn, to the delivery side of a pump 58. Fixedly and coaxially mounted to the pipe 55 end connected to the conduit 57 is a gear wheel 59 in mesh engagement with another gear wheel 61 attached to the shaft of an electric motor 62.

For flushing, the pump 58 is operated to draw water from the water supply and force it into the pipe 55 through the conduit 57. Simultaneously therewith, the electric motor 62 is caused to reciprocate rotatively so as to drive the pipe 55 of the same motion through pulley 61 and pulley 59; the reciprocating rotary motion of the pipe 55 subtends a predetermined angle. Thus, water is forced out of the nozzles 56 toward the component parts to be flushed clean. The arrangement of the nozzles 56 and the angle where through the pipe 55 is reciprocated rotatively should obviously be selected to effectively produce flushing of the machine internal parts, specifically the vat and the baskets.

Of course, a delivery means other than that just described could be used to serve the same functions. Such delivery means may be a movable one like that just described; for instance, a suitably perforated rotor could be arranged to have water pumped thereinto such that the rotor will force the water out in plural directions while turning by reaction. The delivery means may also be provided stationary.

Figure 6:
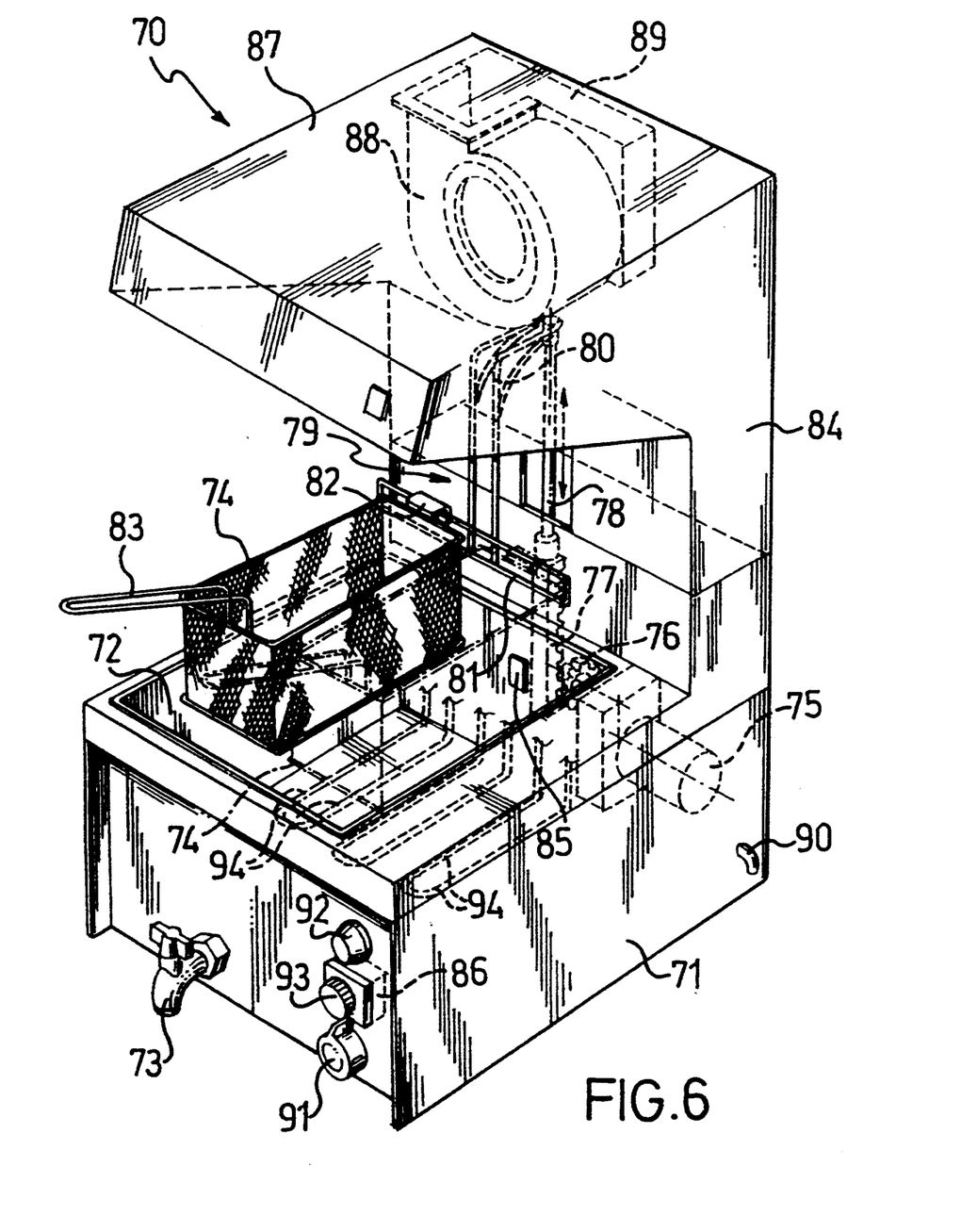
FIG. 6 is a perspective view of a second machine according to the invention.

Shown in FIG. 6 is a machine which can prepare dishes for direct consumption in a semiautomatic manner from precooked and deep-frozen pasta.

This machine, generally designated 70, comprises a box-type body 71 accommodating a vat 72. The body 71 is open upwardly to leave the vat 72 exposed to the outside.

In a similar manner to the previously described machine 10, the vat 72 is adapted to contain water from the water supply and has electric resistance heaters 94 for heating the water. The vat 72 design and the arrangement of the electric resistance heaters 94 are similar to those for the vat 20. Once again, a level sensor for controlling a solenoid valve to admit water into the vat 70 and a cock, shown in FIG. 6 and designated 73, for draining the water off the vat are provided. Additionally, a thermostat 85 is obviously arranged to control the water temperature, which will turn on or off the electric resistance heater depending on that temperature.

Once again, two baskets 74 are provided. As against machine 10, however, the two baskets 74 are driven linearly in a vertical direction between two positions, that is a dipped position into the water contained in the vat 72 and a removed position from the vat.

The baskets 74 are driven by an electric motor 75 which is connected to a pinion gear 76 enmeshed with a vertically movable rack 77. The rack 77 is connected, via a rod 78, rigidly to a supporting member 79 comprising an L-shaped portion 80 and a hooking portion 81 which extends horizontally and symmetrically from one end of portion 80. That portion 81 locates above the vat 72. Each basket 74 has a hook 82 which enables the basket to be hooked to the aforesaid hooking portion 81 of the supporting member 79; on the remote side from the hook 82, each basket 74 has a hand-grip 83.

The motor 75, pinion gear 76, rack 77, and rod 78 are received inside a rear upright 84 of the machine 70.

A timer 86 controls the duration of the dipped condition of the baskets 74 in the water.

The machine 70 operates as follows:

During the starting step, the vat 72 is filled with water and the water is then heated to boiling temperature by means of the electric resistance heaters 94. The baskets 74 are hooked on the portion 81 of the support member 79 such that they are held in a substantially horizontal working position. The support member 79 locates in a top end position corresponding to said removed position of the baskets 74.

At this stage, the operator will load manually the dosages of precooked deep-frozen pasta directly into the baskets 74 and control the energization of the electric motor 75, which rotates the pinion gear 76 to drive the rack 77 and, hence, the support member 79 downwards to a bottom end position, so as to correspondingly lower the baskets 74 into the vat 72 until the pasta becomes fully submerged in the water. After a required time period to have the pasta heated and returned to optimum conditions for its consumption, the timer 86 energizes the motor 75 to turn in the opposite direction to its former rotation and drive the support member 79 upwards to its top end position, so that the baskets 74 are raised out of the vat 72 to allow the pasta to be drained. Once the pasta is drained, the operator grasps each basket 74 by its hand-grip 83, releases it from the hooking portion 81 of the support member 79, and pours its contents into a dish for consumption.

Thus, with the machine 70, dishes for direct consumption can also be prepared quickly from precooked deep-frozen pasta, on account of the extremely simple handling of the baskets 74 provided. Further, the automatic control of the water temperature afforded by the thermostat 85 and of the stay time of the pasta in the water by the timer 86 yields pasta dishes for direct consumption which are in an optimum condition for consumption.

Each basket 74 allows proper metering of the amounts of pasta because it can be sized to contain a predetermined number of pasta dosages (one or more dosages).

The steam issuing from the boiling water in the vat 72 collects in a suction hood 87 overlying the vat and supported by the upright 84. The hood 87 comprises a centrifugal aspirator 88 which conveys the steam towards a labyrinth where the steam condenses. The drops of condensate drip onto the bottom of the machine 70 along the inside of the upright 84 and are drained off by gravity from the bottom through a conduit 90.

In this way, during the operation of the machine, the steam and the accompanying smell are eliminated, therefore avoiding to pervade with such steam and smell the room where the machine operates.

On the front of the machine there are provided a switch 91, a pushbutton 92 for starting the operation cycle, and a setting knob 93 connected to the timer 86 for setting the pasta heating time.

Obviously, also for the machine 70 variations to what has been described and illustrated can be provided. Specifically, other means for moving the baskets may be used equivalent to that seen above. The shape of the vat and the location of the electric resistance heater may be similar to that seen for the vat 50 in the previous machine. The suction hood may be of any type suitable to the suction and to the steam condensation. One or more baskets may be provided.

In general, the precooked deep-frozen pasta for loading into machine 10 or machine 70 may be advantageously packed in sealed single dosage packages which would be just unsealed upon loading them into the machine. This ensures sanitary handling and precise metering.

What is claimed is:

1. A machine for preparing pasta-based dishes for direct consumption starting from precooked deep-frozen pasta products, comprising at least one basket adapted to receive dosages of precooked deep-frozen pasta, a vat containing heated water, a means for moving the basket between an immersed position where the basket is submerged under the heated water contained in the vat for heating the precooked deep-frozen pasta and a removed position where the basket is removed from the vat;

loading means for loading precooked deep-frozen pasta dosages into said basket comprising at least one chest slidable in a box-type seat within a body of the machine, the chest having at least a first opening which, in one operational position of the chest, overlies a first opening in the seat for introducing the precooked deep-frozen pasta into the chest, the chest also having at least a second opening which, in a successive operational position of the chest, overlies a second opening in the seat for unloading the precooked deep-frozen pasta into the basket; and external drive means for driving said loading means.

2. A machine according to claim 1, wherein the removed position of the basket includes a position where the heated pasta is unloaded from the basket.

3. A machine according to claim 1, wherein said external drive means comprises a rod extending from the machine body.

4. A machine according to claim 1, wherein said basket moving means is further operative for positioning the basket in an intermediate position, intermediate to the basket immersed position and the basket removed position for loading the basket with the precooked deep-frozen pasta and straining the heated pasta.

5. A machine according to claim 4, further comprising timer means operatively associated with said basket moving means for controlling the duration during which the basket occupies said immersed and removed positions and said intermediate position.

6. A machine according to claim 1, wherein the means for moving the basket includes at least a first motor for providing rotary basket motion.

7. A machine according to claim 1, wherein a heater means and a temperature sensing means are provided in the vat to raise and maintain the water contained in the vat to a boiling temperature.

8. A machine according to claim 1, further comprising at least a first chamber formed in the machine body and accommodating at least a first vessel for receiving steam released from the heated water contained in the vat.

9. A machine according to claim 8, further comprising a fan for forcibly conveying said steam into said chamber.

10. A machine according to claim 8, wherein the machine includes a bottom collecting the drops of condensate which results from condensation of the steam, and a conduit for draining the drops of condensate from the bottom to the outside.

11. A machine according to claim 8, further comprising a lid for providing access to said chamber.

12. A machine according to claim 1, further comprising sensor means for sensing the level of the free surface of the water in the vat, and a valve means to for allowing the inflow of water into the vat from an outside source, wherein said valve means and said sensor means cooperate to maintain a predetermined level of the free surface of the water inside the vat.

13. A machine according to claim 1, having a front provided with a window through which the basket can be observed in its operational positions.

14. A machine according to claim 1, wherein an outlet, extending from the machine body is provided to direct the heated pasta being unloaded from the basket.

15. A machine according to claim 1, wherein the vat includes a heated well.

16. A machine according to claim 15, comprising an electric resistance heater for heating the well and, hence, the water in the vat.

17. A machine according to claim 1, further comprising delivery means inside the machine for providing a pressurized flushing liquid, said delivery means including nozzles for directing jets of the flushing liquid toward a portion of the machine to be flushed.

18. A machine according to claim 1, wherein said external drive means is operative for providing rectilinear motion of said loading means.

19. A machine according to claim 1, wherein said loading means comprises at least two slidable chests.

* * * * *